INVENTOR.
Robert D. Lohman
BY Morris & Rabkin
ATTORNEY.

United States Patent Office 2,974,238

Patented Mar. 7, 1961

2,974,238

MULTIVIBRATOR CIRCUIT

Robert D. Lohman, Princeton, N.J., assignor to Radio Corporation of America, a corporation of Delaware Filed Nov. 4, 1957, Ser. No. 694,385

9 Claims. (Cl. 307—88.5)

This invention relates to multivibrator circuits and in particular relates to a novel triggerable bistable multivibrator and its associated steering circuit.

Bistable multivibrators are well known in the art. A triggerable bistable multivibrator is a device having two stable states whereby the circuit remains in either state until caused to change to the other state by the application of a trigger signal.

Bistable multivibrators, also termed flip-flops, are frequently used in high speed counting devices.

Therefore, it is an object of this invention to provide a novel high speed flip-flop.

It is a further object of this invention to provide a novel, reliable, and economical flip-flop which operates at extremely high speeds.

In accordance with this invention, a flip-flop trigger steering circuit comprising a pair of capacitors is adapted to operate at higher speeds by coupling a pair of diodes for rapid charging of the capacitors.

In order to cause a bistable circuit to count reliably in the binary sense, it is desirable to "steer" the pulses to be counted so that the trigger action of the bistable circuit is always initiated to produce a correct count. For example, if the input signal is a rectangular wave, the bistable circuit should change state on either each positive going edge or each negative going edge of the wave. The invention described herein combines the advantages of the diode steering circuits which are well known in the art with the further advantage of very fast recovery time.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
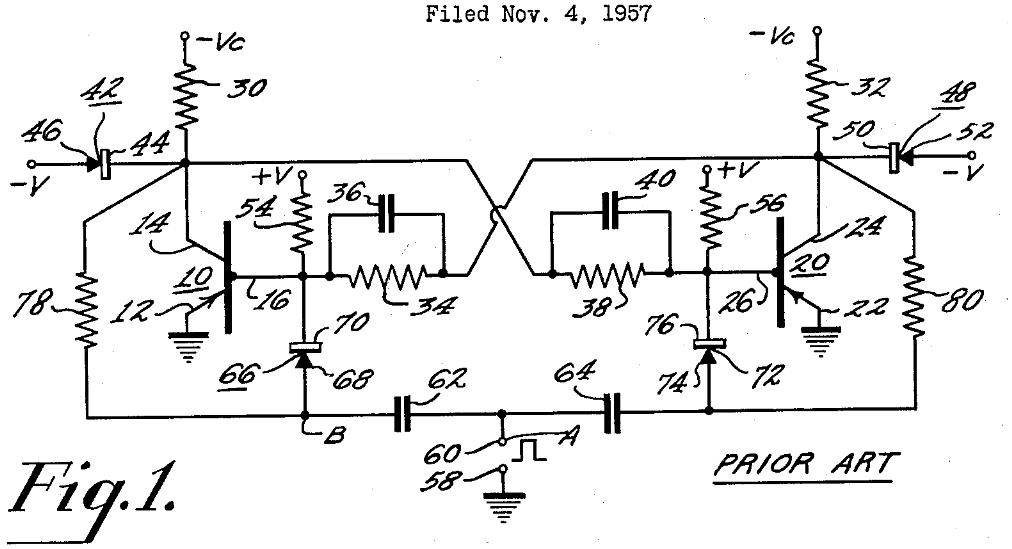
Figure 1 illustrates a known flip-flop circuit.
Figure 2:
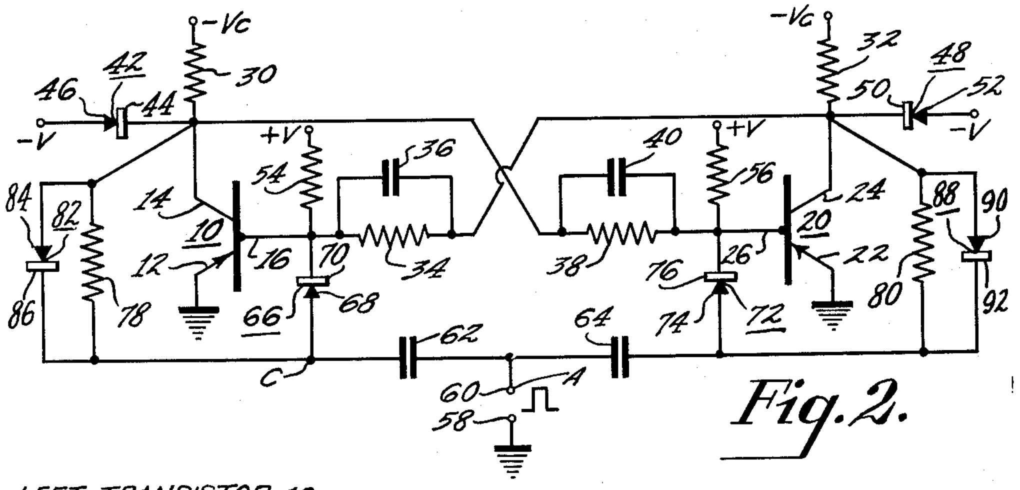
Figure 2 illustrates an embodiment of this invention.

In order to assist in explaining the invention as illustrated in Figure 2, a description of the circuit of the prior art flip-flop as shown in Figure 1 initially will be discussed.

Referring now to Figure 1, there is shown a left transistor 10 and a right transistor 20 having, respectively, emitters 12, 22, collectors 14, 24, and bases 16, 26. Transistors of the p-n-p type are illustrated. However, it is to be understood that this invention is applicable with transistors of the opposite type conductivity with appropriate changes of potentials. The emitters 12, 22 of the respective transistors 10, 20 are coupled to a point of reference potential illustrated as ground. The collector 14 of the left transistor 10 is connected to a potential source $-V_c$ negative with respect to ground through a resistor 30. Similarly, the collector 24 of the right transistor 20 is connected to the potential source $-V_c$ through a resistor 32. The base 16 of the left transistor 10 is coupled to the collector 24 of the right transistor 20 by a parallel connected resistor 34 and a capacitor 36. Likewise, the base 26 of the right transistor 20 is cross-coupled to the collector 14 of the left transistor 10 by means of a parallel connected resistor 38 and capacitor 40. The collector 14 of the left transistor 10 is coupled to a diode 42 at its cathode 44. The collector 24 of the right transistor 20 is coupled to another diode 48 at its cathode 50. The anodes 46 and 52 of the diodes 42 and 48, respectively, are coupled to a potential source $-V$ negaitve with respect to ground. The left base 16 is coupled to a biasing source $+V$ positive with respect to ground through a resistor 54. The right base 26 is likewise coupled to the $+V$ volts biasing source through a resistor 56.

An input signal is applied across a pair of terminals 58, 60. The terminal 58 is connected to the point of reference potential, indicated as ground, while the terminal 60 is coupled to a pair of capacitors 62 and 64. The left capacitor 62 is coupled to a left steering diode 66 at its anode 68. The cathode 70 of the left steering diode 66 is coupled to the base 16 of the left transistor 10. On the other hand, the capacitor 64 is, in turn, connected to a right steering diode 72 at its anode 74. The cathode 76 of the right steering diode 72 is connected to the base 26 of the right transistor 20. A left resistor 78 couples the collector 14 of the left transistor 10 to the anode 68 of the left steering diode 66. A right resistor 80 connects the collector 24 of the right transistor 20 with the anode 74 of the right steering diode 72.

Figure 2, in accordance with the invention, illustrates the circuit shown in Figure 1 with modifications according to the invention. A left charging diode 82 has its anode 84 connected to the collector 14 of the left transistor 10 and has its cathode 86 connected to the anode 68 of the left steering diode 66. A right charging diode 88 has its anode 90 coupled to the collector 24 of the right transistor 20 and has its cathode 92 connected to the anode 74 of the right steering diode 72.

Figure 3:
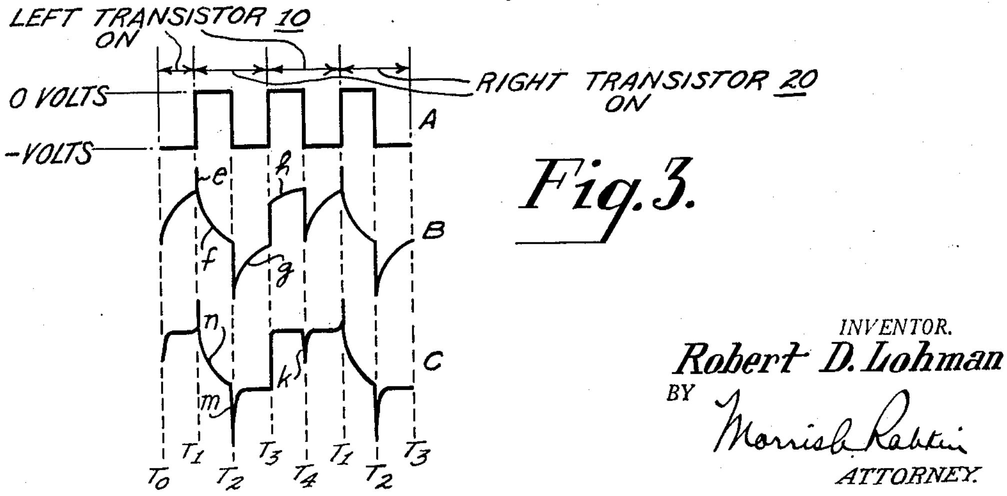
Figure 3 illustrates a number of timing diagrams in accordance with voltage changes occurring throughout the circuits of Figure 1 and Figure 2.

Referring now to the operation of the circuit of Figure 1, a rectangular voltage wave, as shown in Figure 3, curve A, is applied to the terminal 60. Assume initially, at a time $T_0$, that the left transistor 10 is conducting (that is "on"), that the right transistor 20 is not conducting (that is "off"), and that the input voltage applied to the terminal 60 is at $-V$ volts, a value corresponding to the source $-V$. When the left transistor 10 is conducting, the cathode 76 of the right steering diode 72 is at a slight positive potential while its anode 74 is at $-V$ volts. The right steering diode 72 is, therefore, cut off. The left steering diode 66 is biased in the forward direction so as to pass an input pulse. At a time $T_1$, as shown in Figure 3, an input trigger voltage is applied to terminal 60 going positive to ground. The charge present on the left capacitor 62 discharges through the left steering diode 66 turning the left transistor 10 off (see *e* at curve B, Figure 3). This rapid discharging is a function of the time constant of the left steering diode 66 and the left transistor 10. The right transistor 20 is unaffected by the excursion of the input trigger voltage because the right steering diode 72 remains slightly reverse biased. When the left transistor 10 turns off, the voltage at the left collector 14 decreases (that is, increases in a negative direction). This drop in voltage is transmitted to the base 26 of the right transistor 20 through the parallel connected resistor 38 and capacitor 40 thereby turning the right transistor 20 on and, therefore, the circuit changes its state. The biasing diodes 42 and 48 perform a clamping action in known manner.

The following sequence of operations will best be described in terms of the left resistor 78, the left capacitor 62 and the left steering diode 66. Since the circuit is symmetrical, similar occurrences occur for the right resistor 80, the right capacitor 64 and the right steering diode 72 at their respective phase of the cycle.

During the period of time from $T_1$ and $T_2$, when the input voltage to terminal 60 remains at ground potential, the left capacitor 62 is charged through the left resistor 78 (see *f* at curve B, Figure 3).

At the time $T_2$, the trigger potential drops from ground to −V volts. During the interval from $T_2$ to $T_3$ (see *g* at curve B), the charge on the capacitor 62 is discharged through the left resistor 78.

At the time $T_3$, a positive pulse is applied to the trigger terminal 60 which turns the right transistor 20 off and turns the left transistor 10 on. At time $T_4$, the capacitor 62 is uncharged due to the fact that the input terminal 60 is at ground potential and the collector 14 of the left transistor 10 is also at ground potential (see *h* at curve B).

At a time $T_4$, the trigger pulse drops to −V volts, causing the left steering capacitor 62 to charge to −V volts through the resistor 78. Then, the cycle proceeds again as described.

The latter charging of the left steering capacitor 62, when the left transistor 10 is conducting and when the trigger voltage goes negative (at time $T_4$), causes the circuit to have limitations with respect to repetition rate. If the trigger voltage were to go positive again before the steering capacitor 62 is fully charged, the steering capacitor 62 may not contain enough charge to turn the left transistor off and, therefore, the circuit will fail to trigger properly. If, however, the left resistor 78 is reduced to decrease the time constant, the effective current gain of the circuit is reduced at the time when the left transistor has just been turned off because current flows through the left resistor 78 which could be used at base current to turn the right transistor on. The minimum value of the left steering capacitor 62 is determined by the characteristics of transistors employed in the circuit.

The permissible repetition rate is greatly increased by the application of a pair of diodes for charging the left and right capacitors 62, 64 as illustrated in Figure 2. The left charging diode 82 and the right charging diode 88 provide a very low time constant path for charging the steering capacitors 62, 64 when they need to be charged quickly without adversely affecting the operation of the circuit during other parts of the cycle. Following the sequence of operation as described above with the circuit of Figure 2, it is seen that the crucial charging of the steering capacitor 62 (see part *k* of curve C Figure 3) now proceeds through the charging diode 82. The capacitor discharge (see part *m* of curve C Figure 3) which precedes this charging also goes through the charging diode 82 while the initial charging (see part *n* of curve C Figure 3) which produces the behavior necessary for the stability of the circuit still proceeds through the left resistor 78 (and also, as described above for the right portion of the circuit during the appropriate phase of the cycle).

The circuit of Figure 2 provided an increase in repetition rate of 4 to 1 over that of Figure 1. Referring to the embodiment of the invention as illustrated in Figure 2 and to waveform C in Figure 3, the device operates as follows: Assume that at the time $T_0$, the left transistor 10 is conducting. At a time $T_1$, a positive going voltage level is applied to the trigger terminal 60. The charge built up on the left capacitor 62 is discharged through the left steering diode 66 turning the left transistor off. The turning off of the left transistor 10 by normal multivibrator action operates to turn the right transistor 20 on. As shown by the waveform C (at *n*), the left capacitor 62 is charged to −V volts through the resistor 78 in the normal manner. At a time $T_2$, the positive going trigger pulse is removed from the trigger terminal 60 to a negative going voltage to a level of −V volts. The capacitor 62 now discharges through the diode 82 (see part *n* of curve C).

At a time $T_3$, another positive going pulse is applied to the trigger terminal 60. This positive going voltage level turns the right transistor 20 off and the left transistor 10 on, as described above. The voltage at point C approaches ground potential due to the fact that the potential at the collector 14 and at the input trigger terminal 60 are at ground potential. At a time $T_4$ the trigger voltage decreases to −V volts and the capacitor is charged, very quickly (see *k*) through the left charging diode 82.

The following values are given which are representative of an operable system. It is to be understood, however, that other values may be used without detracting from the essence of this invention.

| | |
|---|---|
| Transistor 10 | 2N269 |
| Transistor 20 | 2N269 |
| Resistor 30 | 1.6K |
| Capicitor 36 | 150 μμf. |
| Resistor 32 | 1.6K |
| Resistor 34 | 7.5K |
| Resistor 38 | 7.5K |
| Capacitor 40 | 150 μμf. |
| Diode 42 | 1N38A |
| Diode 48 | 1N38A |
| Resistor 54 | 33K |
| Resistor 56 | 33K |
| Capacitors 62 and 64 are each | 180 μμf. |
| Diode 66 | 1N38A |
| Diode 72 | 1N38A |
| Resistor 78 | 10K |
| Resistor 80 | 10K |
| Diode 82 | 1N38A |
| Diode 88 | 1N38A |
| Potential source | +V +6 volts |
| Potential source | −V −6 volts |
| Voltage source | $-V_c$ −18 volts |

Although there has been described a system incorporating a specific prior art flip-flop circuit, it is to be understood that similar flip-flop circuits may be used. That is, the circuit operates with appropriate modifications with N–P–N type transistors, vacuum tubes, and the like.

What is claimed is:

1. In a bistable flip-flop circuit having a first transistor of one conductivity type, a second transistor of the same conductivity type, each of said transistors having a collector, a base, and an emitter, means coupling said emitters to a point of reference potential, a first impedance having one terminal thereof coupled to said collector of said first transistor, a second impedance having one terminal thereof connected to said collector of said second transistor, means for applying a biasing potential to the other terminals of said first and said second impedance means, parallel connected resistance and capacitance means coupling said base of said first transistor to said collector of said second transistor, parallel connected resistance and capacitance means coupling said base of said second transistor to said base of said first transistor, a first steering diode having one electrode connected to said base of said first transistor, a second steering diode having one electrode connected to said base of said second transistor, a first resistor coupling said collector of said first transistor to the other electrode of said first steering diode, a second resistor coupling said collector of said second transistor to the other electrode of said second steering diode, a first capacitor having one terminal thereof connected to said other electrode of said first steering diode, a second capacitor having one terminal thereof connected to said other electrode of said second steering diode, and a trigger input terminal coupled to the other terminals of said first and second capacitors, the improvement characterized by a first charging unilateral conducting means having one terminal connected to said first transistor collector and having its other terminal connected to said other electrode of said first steering diode and a second changing unilateral coducting means having one terminal thereof coupled to said second transistor collector and its other terminal thereof connected to said other electrode of said second diode.

2. In a bistable flip-flop circuit having a first transistor of one conductivity type, a second transistor of the same conductivity type, each of said transistors having a collector, a base, and an emitter, means coupling said emitters to a point of reference potential, a first impedance having one terminal thereof coupled to said collector of said first transistor, a second impedance having one terminal thereof connected to said collector of said second transistor, means for applying a biasing potential to the other terminals of said first and said second impedance means, parallel connected resistance and capacitance means coupling said base of said first transistor to said collector of said second transistor, parallel connected resistance and capacitance means coupling said base of said second transistor to said base of said first transistor, a first steering diode having one electrode connected to said base of said first transistor, a second steering diode having one electrode connected to said base of said second transistor, a first resistor coupling said collector of said first transistor to the other electrode of said first steering diode, a second resistor coupling said collector of said second transistor to the other electrode of said second steering diode, a first capacitor having one terminal thereof connected to said other electrode of said first steering diode, a second capacitor having one terminal thereof connected to said other electrode of said second steering diode, and a trigger input terminal coupled to the other terminals of said first and second capacitors, the improvement characterized by a first charging unilateral conducting means connected in parallel with said first resistor for charging said first capacitor and a second charging unilateral conducting means connected in parallel with said second resistor for charging said second capacitor.

3. The combination with a flip-flop circuit including a pair of active electron devices each having a first electrode, a second electrode, and a control electrode; a pair of cross-coupling networks respectively connecting said control electrode and said first electrode of different said electron devices; signal input means; and a pair of signal gating circuits each comprising a capacitor connected between said signal input means and a different junction point, a first unilateral conducting device connected between said junction point and said control electrode of one of said electron devices, and an impedance means connected between said junction point and said first electrode of said one of said electron devices; of a pair of second unilateral conducting devices each connected in parallel with a respective said impedance means to provide faster charging of the connected said capacitor.

4. The combination with a flip-flop circuit including a pair of active electron devices each having a first electrode, a second electrode, and a control electrode; a pair of cross-coupling networks respectively connecting said control electrode and said first electrode of different said electron devices; means holding each said second electrode at a fixed potential; signal imput means; and a pair of signal gating circuits each comprising a capacitor connected between said signal input means and a different junction point, a first unilateral conducting device connected between said junction point and said control electrode of one of said electron devices, and an impedance means connected between said junction point and said first electrode of said one of said electron devices; of a pair of second unilateral conducting devices each connected in parallel with a respective said impedance means to provide faster charging of the connected said capacitor.

5. The combination with a flip-flop circuit including a pair of active electron devices each having a first electrode, a second electrode, and a control electrode; a pair of cross-coupling networks respectively connecting said control electrode and said first electrode of different said electron devices; signal input means; biasing means connected to each said control electrode tending to bias each of said electron devices to a non-conducting state, said pair of cross-coupling networks being effective to overcome said bias on said electron devices alternately in response to successive signals applied at said signal input means; and a pair of signal gating circuits each comprising a capacitor connected between said signal input means and a different junction point, a first unilateral conducting device connected between said junction point and said control electrode of one of said electron devices, and an impedance means connected between said junction point and said first electrode of said one of said electron devices; of a pair of second unilateral conducting devices each connected in parallel with a respective said impedance means to provide faster charging of the connected said capacitor.

6. The combination with a flip-flop circuit including a pair of semiconductor devices each having a collector electrode, an emitter electrode, and a base electrode; a pair of cross-coupling networks respectively connecting said base electrode and said collector electrode of different said semiconductor devices; signal input means; and a pair of signal gating circuits each comprising a capacitor connected between said signal input means and a different junction point, a first unilateral conducting device connected between said junction point and said base electrode of one of said semiconductor devices, and an impedance means connected between said junction point and said collector electrode of said one of said semiconductor devices; of a pair of second unilateral conducting devices each connected in parallel with a respective said impedance means to provide faster charging of the connected said capacitor.

7. The combination with a flip-flop circuit including a pair of active electron devices each having a first electrode, a second electrode, and a control electrode; a pair of cross-coupling networks respectively connecting said control electrode and said first electrode of different said electron devices; signal input means; and a pair of signal gating circuits each comprising a capacitor connected between said signal input means and a different junction point, a first diode connected between said junction point and said control electrode of one of said electron devices, and an impedance means connected between said juction point and said first electrode of said one of said electron devices; of a pair of second diodes each connected in parallel with a respective said impedance means to provide faster charging of the connected said capacitor.

8. The combination with a flip-flop circuit including a pair of active electron devices each having a first electrode, a second electrode, and a control electrode; a pair of cross-coupling networks respectively connecting said control electrode and said first electrode of different said electron devices; signal input means; and a pair of signal gating circuits each comprising a capacitor connected between said signal input means and a different junction point, a first unilateral conducting device connected between said junction point and said control electrode of one of said electron devices, and a resistive element connected between said junction point and said first electrode of said one of said electron devices; of a pair of second unilateral conducting devices each connected in parallel with a respective said resistive element to provide faster charging of the connected said capacitor.

9. The combination with a flip-flop circuit including a pair of active electron devices each having a first electrode, a second electrode, and a control electrode;

a pair of cross-coupling networks respectively connecting said control electrode and said first electrode of different said electron devices; signal input means; biasing means connected to each said control electrode tending to bias each of said electron devices to a non-conducting state, said pair of cross-coupling networks being effective to overcome said bias on said electron devices alternately in response to successive signals applied at said signal input means; and a pair of signal gating circuits each comprising a capacitor connected between said signal input means and a different junction point, a first unilateral conducting device connected between said junction point and said control electrode of one of said electron devices, and an impedance means connected between said junction point and said first electrode of said one of said electron devices, each said first unilateral conducting device being poled so as to be reverse-biased when its associated said electron device is in said non-conducting state; of a pair of second unilateral conducting devices each connected in parallel with a respective said impedance means to provide faster charging of the connected said capacitor.

References Cited in the file of this patent

UNITED STATES PATENTS

| | | |
|---|---|---|
| 2,787,712 | Priebe et al. | Apr. 2, 1957 |
| 2,823,856 | Booth et al. | Feb. 18, 1958 |
| 2,861,200 | Henle et al. | Nov. 18, 1958 |
| 2,882,424 | Wohr | Apr. 14, 1959 |
| 2,884,544 | Warnock | Apr. 28, 1959 |

OTHER REFERENCES

Wolfendale et al.: "The Junction Transistor as a Computing Element," Electronic Engineering, March 1957.

Disclaimer 2,974,238.—*Robert D. Lohman*, Princeton, N.J. MULTIVIBRATOR CIRCUIT. Patent dated Mar. 7, 1961. Disclaimer filed July 21, 1972, by the assignee, *Radio Corporation of America.*

Hereby enters this disclaimer to claims 1 through 9, inclusive of said patent.

[*Official Gazette December 5, 1972.*]